United States Patent
Miyasaka (10) Patent No.: US 7,520,620 B2
(45) Date of Patent: Apr. 21, 2009

(54) PROJECTOR AND PROJECTOR CONTROL METHOD

(75) Inventor: Noriaki Miyasaka, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 436 days.

(21) Appl. No.: 11/175,316

(22) Filed: Jul. 7, 2005

(65) Prior Publication Data

US 2006/0023171 A1    Feb. 2, 2006

(30) Foreign Application Priority Data

Jul. 30, 2004   (JP)   ............... 2004-223657

(51) Int. Cl.
  G03B 21/14   (2006.01)
  G03B 3/00    (2006.01)
  H04N 3/23    (2006.01)
  H04N 3/223   (2006.01)

(52) U.S. Cl. .................. 353/69; 353/121; 353/101; 348/746; 348/747

(58) Field of Classification Search ............. 353/69, 353/121, 122, 101; 348/745–747
See application file for complete search history.

(56) References Cited

U.S. PATENT DOCUMENTS 6,592,228 B1 * 7/2003 Kawashima et al. ........ 353/101
6,707,500 B1 * 3/2004 Tamura et al. ............. 348/362
7,145,733 B2 * 12/2006 Miyasaka .................. 359/697
7,237,907 B2 * 7/2007 Li et al. ...................... 353/70
7,293,883 B2 * 11/2007 Miyasaka .................. 353/122
2005/0185285 A1 * 8/2005 Miyasaka .................. 359/676
2005/0231820 A1 * 10/2005 Miyasaka .................. 359/686

FOREIGN PATENT DOCUMENTS

JP    A 2000-241874    9/2000

* cited by examiner

Primary Examiner—Diane I Lee
Assistant Examiner—Magda Cruz
(74) Attorney, Agent, or Firm—Oliff & Berridge, PLC (57) ABSTRACT

For a projector, a CPU references an exposure calculation object scope setting table stored in an exposure calculation object scope setting table storing unit, and sets the exposure calculation object scope based on a zoom volume detected by a zoom volume detector. An exposure calculation object scope for each zoom volume is stipulated in the exposure calculation object scope setting table. Next, an imaging control unit images an adjustment pattern image projected onto a screen by a CCD module, and calculates an exposure calculation value for the set exposure calculation object scope. Then, the imaging control unit controls at least one item among the shutter speed, gain, and aperture for the imaging unit to perform exposure adjustment so that the exposure calculation value is about equal to a specified exposure target value. By doing this, even when the zoom volume of the zoom lens changes, it is possible to approximately maintain the average value of the gradation values of the adjustment pattern image for the imaged image at a desired gradation value.

9 Claims, 10 Drawing Sheets

Fig.1

Fig.2(a)
z = 0: TELEPHOTO SIDE

Fig.2(b)
z = 255: WIDE ANGLE SIDE

Fig.3

| ZOOM VOLUME z | Az, Cz X COORDINATES | Az, Bz Y COORDINATES | Bz, Dz X COORDINATES | Cz, Dz Y COORDINATES |
|---|---|---|---|---|
| 0 | 170 | 215 | 470 | 440 |
| 5 | 167 | 211 | 473 | 440 |
| 10 | 164 | 207 | 476 | 441 |
| 15 | 161 | 203 | 479 | 441 |
| 20 | 158 | 199 | 482 | 442 |
| 25 | 155 | 195 | 485 | 442 |
| 30 | 152 | 191 | 488 | 443 |
| 35 | 149 | 188 | 491 | 443 |
| 40 | 146 | 184 | 494 | 444 |
| 45 | 144 | 180 | 496 | 444 |
| 50 | 141 | 176 | 499 | 445 |
| 55 | 138 | 172 | 502 | 445 |
| 60 | 135 | 168 | 505 | 446 |
| 65 | 132 | 164 | 508 | 446 |
| 70 | 129 | 160 | 511 | 447 |
| 75 | 126 | 156 | 514 | 447 |
| 80 | 123 | 152 | 517 | 448 |
| 85 | 120 | 148 | 520 | 448 |
| 90 | 117 | 144 | 523 | 449 |
| 95 | 114 | 140 | 526 | 449 |
| 100 | 111 | 137 | 529 | 450 |
| 105 | 108 | 133 | 532 | 450 |
| 110 | 105 | 129 | 535 | 451 |
| 115 | 102 | 125 | 538 | 451 |
| 120 | 99 | 121 | 541 | 452 |
| 125 | 96 | 117 | 544 | 452 |
| 130 | 94 | 113 | 546 | 453 |
| 135 | 91 | 109 | 549 | 453 |
| 140 | 88 | 105 | 552 | 454 |
| 145 | 85 | 101 | 555 | 454 |
| 150 | 82 | 97 | 558 | 455 |
| 155 | 79 | 93 | 561 | 455 |
| 160 | 76 | 90 | 564 | 456 |
| 165 | 73 | 86 | 567 | 456 |
| 170 | 70 | 82 | 570 | 457 |
| 175 | 67 | 78 | 573 | 457 |
| 180 | 64 | 74 | 576 | 458 |
| 185 | 61 | 70 | 579 | 458 |
| 190 | 58 | 66 | 582 | 459 |
| 195 | 55 | 62 | 585 | 459 |
| 200 | 52 | 58 | 588 | 460 |
| 205 | 49 | 54 | 591 | 460 |
| 210 | 46 | 50 | 594 | 461 |
| 215 | 44 | 46 | 596 | 461 |
| 220 | 41 | 42 | 599 | 462 |
| 225 | 38 | 39 | 602 | 462 |
| 230 | 35 | 35 | 605 | 463 |
| 235 | 32 | 31 | 608 | 463 |
| 240 | 29 | 27 | 611 | 464 |
| 245 | 26 | 23 | 614 | 464 |
| 250 | 23 | 19 | 617 | 465 |
| 255 | 20 | 15 | 620 | 465 |

SCREEN   SCREEN   SCREEN

IMAGED IMAGE   IMAGED IMAGE   IMAGED IMAGE

GRADATION VALUE   GRADATION VALUE   GRADATION VALUE

Fig.7

| AREA SH | Az, Cz X COORDINATES | Az, Bz Y COORDINATES | Bz, Dz X COORDINATES | Cz, Dz Y COORDINATES |
|---|---|---|---|---|
| 67500 | 170 | 215 | 470 | 440 |
| 70074 | 167 | 211 | 473 | 440 |
| 73008 | 164 | 207 | 476 | 441 |
| 75684 | 161 | 203 | 479 | 441 |
| 78732 | 158 | 199 | 482 | 442 |
| 81510 | 155 | 195 | 485 | 442 |
| 84672 | 152 | 191 | 488 | 443 |
| 87210 | 149 | 188 | 491 | 443 |
| 90480 | 146 | 184 | 494 | 444 |
| 92928 | 144 | 180 | 496 | 444 |
| 96302 | 141 | 176 | 499 | 445 |
| 99372 | 138 | 172 | 502 | 445 |
| 102860 | 135 | 168 | 505 | 446 |
| 106032 | 132 | 164 | 508 | 446 |
| 109634 | 129 | 160 | 511 | 447 |
| 112908 | 126 | 156 | 514 | 447 |
| 116624 | 123 | 152 | 517 | 448 |
| 120000 | 120 | 148 | 520 | 448 |
| 123830 | 117 | 144 | 523 | 449 |
| 127308 | 114 | 140 | 526 | 449 |
| 130834 | 111 | 137 | 529 | 450 |
| 134408 | 108 | 133 | 532 | 450 |
| 138460 | 105 | 129 | 535 | 451 |
| 142136 | 102 | 125 | 538 | 451 |
| 146302 | 99 | 121 | 541 | 452 |
| 150080 | 96 | 117 | 544 | 452 |
| 153680 | 94 | 113 | 546 | 453 |
| 157552 | 91 | 109 | 549 | 453 |
| 161936 | 88 | 105 | 552 | 454 |
| 165910 | 85 | 101 | 555 | 454 |
| 170408 | 82 | 97 | 558 | 455 |
| 174484 | 79 | 93 | 561 | 455 |
| 178608 | 76 | 90 | 564 | 456 |
| 182780 | 73 | 86 | 567 | 456 |
| 187500 | 70 | 82 | 570 | 457 |
| 191774 | 67 | 78 | 573 | 457 |
| 196608 | 64 | 74 | 576 | 458 |
| 200984 | 61 | 70 | 579 | 458 |
| 205932 | 58 | 66 | 582 | 459 |
| 210410 | 55 | 62 | 585 | 459 |
| 215472 | 52 | 58 | 588 | 460 |
| 220052 | 49 | 54 | 591 | 460 |
| 225228 | 46 | 50 | 594 | 461 |
| 229080 | 44 | 46 | 596 | 461 |
| 234360 | 41 | 42 | 599 | 462 |
| 238572 | 38 | 39 | 602 | 462 |
| 243960 | 35 | 35 | 605 | 463 |
| 248832 | 32 | 31 | 608 | 463 |
| 254334 | 29 | 27 | 611 | 464 |
| 259308 | 26 | 23 | 614 | 464 |
| 264924 | 23 | 19 | 617 | 465 |
| 270000 | 20 | 15 | 620 | 465 |

PROJECTOR AND PROJECTOR CONTROL METHOD

BACKGROUND OF THE INVENTION

1. Field of the Invention

The present invention relates to a projector for projecting images on a projection object such as a screen, and particularly relates to a projector comprising a zoom lens for which it is possible to change the size (projection scope) of the projection image that is projected, and an imaging unit for imaging the projection images, and a control method for this projector.

2. Description of the Related Art

With projectors in recent years, projectors are known for which a zoom lens is provided as the projection lens, and by driving that zoom lens and changing the zoom volume of that zoom lens, the projection scope of the images formed on the screen can be changed freely.

When installing this kind of projector in front of a screen, it is necessary to perform various adjustments such as zoom adjustment, keystone calibration, focus adjustment, and the like on the projector in advance so that a suitable image is displayed on the screen by the projection light projected onto the screen from the projector.

However, in the case of a portable projector, since there is the possibility that the relative position of the projector and the screen will change when installing a projector, the user had to perform the various adjustments like those noted above at that time, which was very complicated.

In light of this, as noted in Japanese Patent Laid-Open Gazettes No. 2000-241874, for example, conventionally, together with providing a monitor camera in a projector, when installing that projector in front of the screen, first, an adjustment pattern image was projection displayed on the screen by the projector, the screen for displaying that pattern image was imaged by a monitor camera, that imaged image was analyzed, and based on those analysis results, each of the aforementioned types of adjustment was performed automatically.

Generally, the aforementioned monitor camera comprises a CCD (Charge Coupled Device) or the like for converting the light made incident from the lens to electrical signals, and to make the overall imaged image brightness to a preset value (exposure target value), there is an automatic exposure adjustment function for changing the shutter speed, gain (sensitivity), aperture, and the like.

Figure 9A:
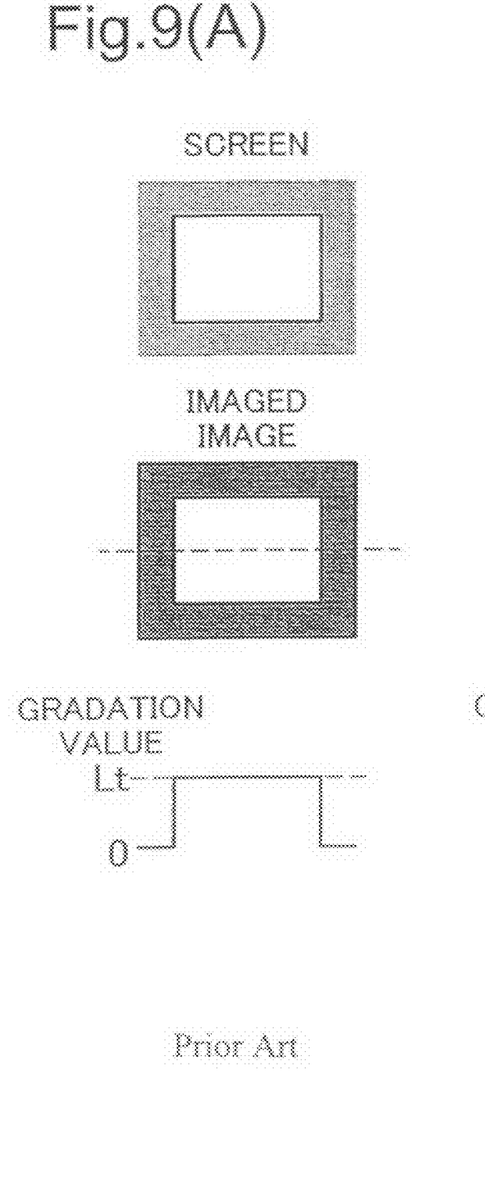
Figure 9B:
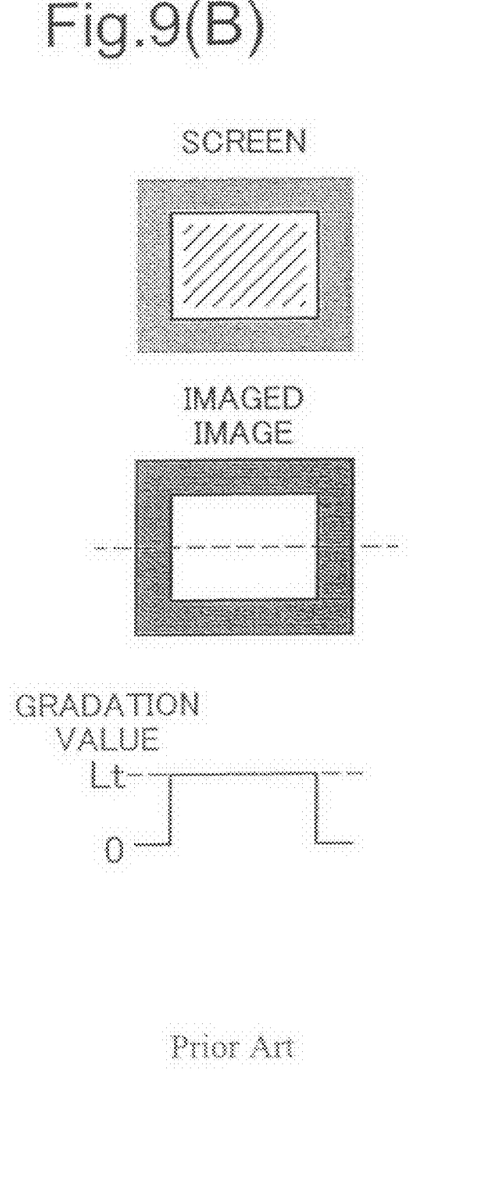

FIG. 9 is an explanatory drawing for explaining the effects of the automatic exposure adjustment function of a conventional monitor camera. In FIG. 9, the upper level indicates a screen for displaying an adjustment pattern image, the middle level indicates the imaged image obtained by imaging that screen using the monitor camera, and the lower level indicates a value representing the brightness of each pixel along the center horizontal line (dotted line) in that imaged image. Also, FIG. 9 (A) shows the status of the projector when set to normal luminance, and FIG. 9 (B) shows the status of the projector when set to low luminance. Note that the value representing the brightness of each pixel for the imaged image is called a gradation value hereafter. This gradation value is a value obtained from image signals of the imaged image output from the monitor camera (CCD module). Also, as illustrated, the projection scopes in FIGS. 9 (A) and (B) are the same.

In FIG. 9, the adjustment pattern image is an all white image, and as shown in the top level, in the screen, the white part scope displayed as the adjustment pattern image is the aforementioned projection scope. The imaged image obtained by imaging using the monitor camera is as shown in the middle level. Also, in the bottom level, the horizontal axis corresponds to the position of each pixel on the center horizontal line of the imaged image, and the vertical axis indicates the gradation value of each pixel.

At the projector, when the luminance of the light source lamp is set to low luminance, compared to when set to normal luminance, the luminance of the projection light projected from the projector is low. Because of this, as shown in FIG. 9 (B), the brightness of the adjustment pattern image displayed on the screen is also dark compared to when set to normal luminance as shown in FIG. 9 (A). However, when that adjustment pattern image is imaged by the monitor camera by operating the automatic exposure adjustment function, even if the object is dark, the shutter speed, gain, and aperture and the like are adjusted to achieve a suitable brightness for the overall imaged image, so with that imaged image, as shown in FIG. 9 (B), the brightness of the adjustment pattern image is not different from when set to normal luminance as shown in FIG. 9 (A). Therefore, for the imaged image, the black part, specifically, the part other than the projection scope, is dark at a negligible level, so in contrast to regarding the gradation value of each pixel for the black part as 0, the gradation value of each pixel of the white part, specifically the adjustment pattern image part, is left approximately at the desired gradation value Lt, and does not change.

In this way, by operating the automatic exposure adjustment function with the monitor camera, at the projector, when the light source lamp is set to low luminance, even when the brightness of the adjustment pattern image displayed on the screen is dark, for the imaged image, the gradation value of each pixel of the white part, specifically the adjustment pattern image part, may be maintained approximately at the desired gradation value Lt, the same as when set to the normal luminance. This is not limited to when set to low luminance, but is also the same when the light source lamp degrades over time and its luminance decreases.

However, for the projector comprising the zoom lens and the monitor camera described above, when the zoom volume of the zoom lens is changed and the projection scope on the screen is changed, due to the automatic exposure adjustment function of the monitor camera, the following kinds of problems occurred.

Figure 10A:
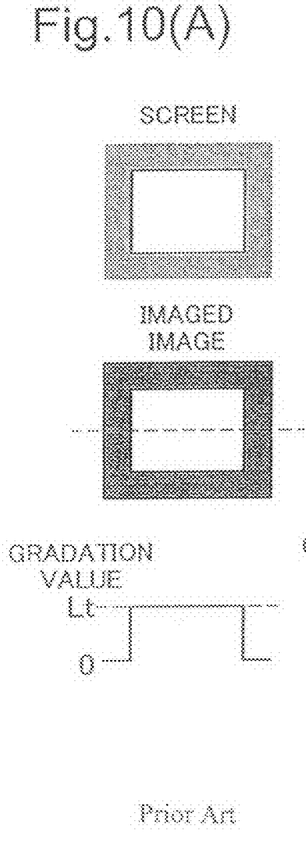
Figure 10B:
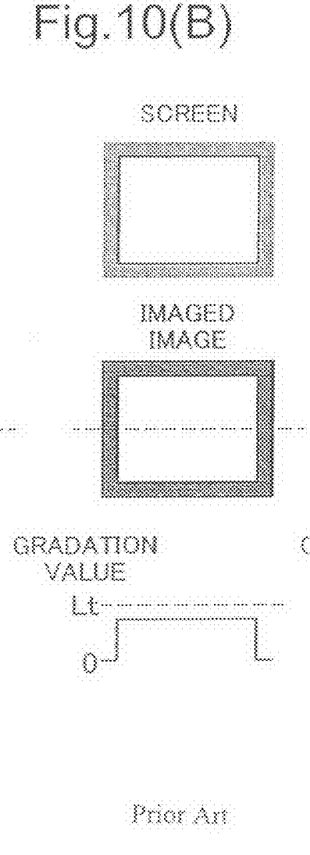
Figure 10C:
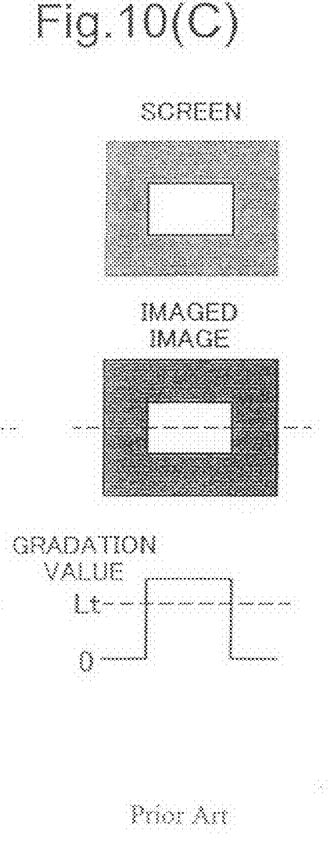

FIG. 10 is an explanatory drawing for describing problems due to the automatic exposure adjustment function of the monitor camera when changing the zoom volume with the conventional art. In FIG. 10, the same as FIG. 9, the upper level shows the screen on which the adjustment pattern image is displayed, the middle level shows the imaged image of that screen, and the lower level shows the gradation value of pixels in that imaged image. Also, FIG. 10 (A) shows the status when the zoom volume of the zoom lens is changed to an intermediate value, FIG. 10 (B) shows the status when the zoom volume of the zoom lens is set to the wide angle side (larger) compared to the intermediate value, and FIG. 10 (C) shows the status when the zoom volume of the zoom lens is set to the telephoto angle side (smaller) compared to the intermediate value.

When the zoom volume of the zoom lens is set to the wide angle side compared to the intermediate value, as shown in the upper level of FIG. 10 (B), the area of the projection scope on the screen is wider than when set to the intermediate value of FIG. 10 (A), and the displayed pattern image is also expanded. Therefore, when the adjustment pattern image is imaged by the monitor camera as shown in the middle level of FIG. 10 (B), in the imaged image, the white part, specifically, the area of the adjustment pattern image part, is wider than when set to the intermediate value of FIG. 10 (A), and the area of the black part, specifically, the part outside the projection scope, becomes narrower.

At this time, when imaging is performed by the monitor camera by operating the automatic exposure adjustment function, the brightness of the overall imaged image is calculated as the exposure calculated value, and so that the exposure calculated value is equal to the preset exposure target value, the shutter speed, gain, aperture, and the like are controlled. Here, the brightness of the overall imaged image is the sum of the volume of the light detected for each pixel with the CCD that was converted to electrical signals and amplified, and that value is proportional to the average value of the gradation value of each pixel for that imaged image. Thus, normally, the exposure calculation value uses the average value of the gradation values of all pixels for the imaged image.

Meanwhile, because the exposure target value is a preset specified value, as shown in FIG. 10 (A), when setting the zoom volume to an intermediate value, if the exposure calculation value matches the exposure target value, as described above, when the zoom volume is set to the wide angle side compared to the intermediate value, and the area of the white part of the imaged image becomes wider, then the average value of the gradation value of all the pixels, specifically, the exposure calculation value, increases compared to the exposure target value by the amount that the are became wider. As a result, when the automatic exposure adjustment function is operated and the shutter speed, gain, aperture and the like are changed so that the exposure calculation value is equal to the exposure target value, the average value of the gradation values of all the pixels for the imaged image decreases. As described above, for the imaged image, the black part is dark to a negligible level, and the gradation value of each pixel for the black part is regarded as 0, so the decrease in the average value of the gradation values for all the pixels means that the gradation values of each pixel for the white part is decreased more than the desired gradation value Lt, as shown in the lower level of FIG. 10 (B).

Conversely, when the zoom volume of the zoom lens is set to the telephoto side compared to the intermediate value, as shown in FIG. 10 (B), the area of the projection scope on the screen becomes narrower compared to when set to the intermediate value of FIG. 10 (A), and the displayed pattern image is also reduced. Therefore, when that pattern image is imaged by the monitor camera, as shown in the middle level of FIG. 10 (C), the area of the white part, specifically, the adjustment pattern image part for that image image is narrower than the intermediate value of (A), and the area of the black part, specifically, the part outside the projection scope, becomes wider.

When the area of the white part of the imaged image becomes narrower, the average value of the gradation values of all the pixels, specifically the exposure calculation value, becomes lower than the exposure target value by the amount that the area narrowed. As a result, when the automatic exposure adjustment function is operated and the shutter speed, gain, aperture, and the like are changed to make the exposure calculation value equal to the exposure target value, the average value of the gradation values of all the pixels for the imaged image increases, and as a result, as shown by the lower level of FIG. 10 (C), the gradation values of each pixel of the white part becomes larger than the desired gradation value Lt.

As described above, conventionally, when the zoom volume of the zoom lens was set to the wide angle side compared to the intermediate value, and the projection scope on the screen became wider, due to the automatic exposure adjustment function of the monitor camera, the gradation values of each pixel of the white part for the imaged image decreased more than the desired gradation value Lt, and conversely, when set to the telephoto side compared to the intermediate value and the projection scope became narrower, the gradation values of each pixel of the white part became greater than the desired gradation value Lt, and in either case, it was not possible to maintain the average value of the gradation values of the white part at the desired gradation value Lt.

Therefore, by changing the zoom volume of the zoom lens, when the average value of the gradation values of the white part for the imaged image is distanced from the desired gradation value Lt, after that, as described above, the imaged image is analyzed, and based on the analysis results, when various adjustments are made automatically, depending on the adjustment contents, there was the problem of not being able to perform adjustments properly.

This kind of problem is not limited to when the adjustment pattern image is all white, but may also similarly occur in cases when it is a specific color (e.g. green, etc.) other than white, or when it is part rather than all of the image.

SUMMARY OF THE INVENTION

The present invention was created to solve the problems described above, and its purpose is to approximately maintain the average value of the gradation values of the adjustment pattern image for the imaged image at the desired gradation value even when the zoom volume of the zoom lens that a projector comprises is changed.

In order to attain at least part of the above and the other related objects, the present invention is directed to a first projector that projects images on a projection object. The first projector comprises: a zoom lens for which it is possible to change the projection scope of the images projected onto the projection object; an imaging unit for imaging the projected specified images; and an imaging control unit for performing exposure adjustment in the imaging unit, and wherein the imaging control unit sets the exposure calculation object scope in the imaged image based on the zoom lens zoom volume, calculates an exposure calculation value from the imaged image for the set exposure calculation object scope, and performs the exposure adjustment so that the calculated exposure calculation value is approximately equal to a specified exposure target value.

The "specified image" is the adjustment pattern image prepared for exposure adjustment. It is possible to use as this adjustment pattern image, for example, an all white image, an image having a specified gradation pattern, a logo, or the like. For the exposure calculation object scope, it is possible to use a rectangular scope or to use another shape scope, for example. Also, for the exposure calculation object scope, it is possible to use the adjustment pattern image for the imaged image as the scope, to use a specified scope including the adjustment pattern image, or to use a specified scope within the adjustment pattern image. However, the relative positional relationship of the adjustment pattern image scope for the imaged image and the exposure calculation object scope is fixed, regardless of the zoom volume of the zoom lens. Also, "such that ... the exposure calculation value is approximately equal to a specified exposure target value" means that the exposure calculation value and the exposure target value do not have to be exactly equal, and that this is acceptable as long as the difference between these falls within a specified range. Note that the specified exposure target value when performing automatic exposure adjustment is fixed, regardless of the zoom volume of the zoom lens. These are also the same for the second projector of the second projector of the present invention described later.

As described previously, with a conventional projector, when performing automatic exposure adjustment, the exposure calculation object scope was the entire imaged image, regardless of the zoom volume of the zoom lens. In contrast to this, with the present invention, the exposure calculation object scope changes according to the zoom volume of the zoom lens, specifically, according to the projection scope of the adjustment pattern image. For example, with the projection scope of the adjustment pattern image when the zoom volume of the zoom lens set as a specified reference value as the reference scope, and the adjustment pattern image scope for the imaged image in this case is the reference exposure calculation object scope. Then, when the zoom volume is changed and the projection scope of the adjustment pattern image is a magnification of "a" of the reference scope, the exposure calculation object scope is also a magnification of "a" of the reference exposure calculation object scope.

By arranging in this way, even when the zoom volume is changed, it is possible to maintain a fixed relative positional relationship between the adjustment pattern image scope of the imaged image and the exposure calculation object scope, or put another way, to maintain a fixed ratio of the area of the adjustment pattern image scope occupying the exposure calculation object scope for the imaged image, regardless of the zoom volume, and to calculate the exposure calculation value. Therefore, it is possible to approximately maintain the exposure calculation value at a fixed level, regardless of the zoom volume. As a result, by performing exposure adjustments so that this exposure calculation value is approximately equal to the specified exposure target value, even when the zoom volume of the zoom lens changes, it is possible to approximately maintain the average value of the gradation value of the adjustment pattern image for the imaged image at the desired gradation value.

For the projector noted above, the imaging control unit may also be made so that when the zoom volume is a second zoom volume that is larger than the first zoom volume for the exposure calculation object scope when the zoom volume is a first zoom volume, the exposure calculation object scope is set to be bigger.

By arranging in this way as well, even when the zoom volume changes, it is possible to approximately maintain the average value of the gradation value of the adjustment pattern image for the imaged image at the desired gradation value.

Also, for the first projector of the present invention, the imaging control unit may also be made to have the exposure calculation object scope set by a specified arithmetic operation based on the zoom volume.

The relationship of the zoom volume of the zoom lens and the magnification of the projection image is known in advance. Therefore, it is possible to easily set the exposure calculation object scope by the specified arithmetic operation.

Also, the first projector of the present invention, further comprises: a specified exposure calculation object scope setting table that is prepared for the specified image and notes the relationship between the zoom volume and the exposure calculation object scope, and wherein the imaging control unit references the exposure calculation object scope setting table and sets the exposure calculation object scope based on the zoom volume.

A suitable exposure calculation object scope for each zoom volume is stipulated in the exposure calculation object scope setting table. As described previously, since the relationship between the zoom volume of the zoom lens and the magnification of the projection image is known in advance, it is possible to prepare in advance the exposure calculation object scope table using a specified arithmetic operation, for example. It is also possible to suitably set the exposure calculation object scope setting table without using a specified arithmetic operation.

With the present invention, it is also possible to set the exposure calculation object scope faster than the calculation by an arithmetic operation.

The present invention is also directed to a second projector that projects images on a projection object. The second projector comprises: a zoom lens for which it is possible to change the projection scope of the image projected on the projection object; an imaging unit for imaging the projected specified image; and an imaging control unit for performing exposure adjustment in the imaging unit, and wherein the imaged image has a high gradation area with a relatively high gradation value and a low gradation area with a relatively low gradation value, and the imaging control unit derives specified parameters relating to the area of the high gradation area from the imaged image, sets an exposure calculation object scope in the imaged image based on the derived parameters, calculates an exposure calculation value for the set exposure calculation object scope from the imaged image, and performs the exposure adjustment so that the calculated exposure calculation value is approximately equal to a specified exposure target value.

For the present invention, the gradation value of the adjustment pattern image for the imaged image is higher than the gradation value outside the adjustment pattern image scope, so the adjustment pattern image scope becomes a high gradation area. "Specified parameters relating to the area" may include not only the area itself, but also the pixel count or the length of a side when the adjustment pattern image is rectangular.

As described previously, with conventional projectors, when performing automatic exposure adjustment, the exposure calculation object scope was the overall imaged image, regardless of the zoom volume of the zoom lens. In contrast to this, with the present invention, the exposure calculation object scope is changed according to the value of the aforementioned parameters. For example, with the area of a high gradation area as the reference area when the zoom volume of the zoom lens is set to a specified reference position, the high gradation area scope in this case is the reference exposure calculation object scope. Then, when the zoom volume is changed and the area of the high gradation area is set to a magnification of "a" of the reference area, the exposure calculation object scope is also a magnification of "a" of the reference exposure calculation object scope.

By arranging in this way, even if the zoom volume changes, it is possible to calculate the exposure calculation value with the relative positional relationship of the adjustment pattern image scope for the imaged image and the exposure calculation object scope maintained at a fixed level. Therefore, it is possible to approximately maintain the exposure calculation value at a fixed level, regardless of the zoom volume. As a result, by performing exposure adjustment so that this exposure calculation value is approximately equal to the specified exposure target value, even when the zoom volume of the zoom lens changes, it is possible to approximately maintain the average value of the gradation value of the adjustment pattern image gradation value for the imaged image at the desired gradation value.

For the aforementioned projector, it is possible to further comprise an exposure calculation object scope setting table that notes the relationship between the parameters prepared for the specified image and the exposure calculation object scope, and the imaging control unit may also be made to reference the exposure calculation object scope setting table, and to set the exposure calculation object scope based on the parameters.

The shape of the adjustment pattern image is known in advance, so it is possible to prepare in advance the exposure calculation object scope setting table in which is noted the relationship between the values of the aforementioned parameters and the exposure calculation object scope.

Note that for the first or the second projector of the present invention, when the projector comprises a shift volume change unit for changing the shift volume from the reference position of the optical axis of the projection optical system, it is possible to have the imaging control unit made to further set the exposure calculation object scope based on the shift volume.

When the shift volume changes from the reference position of the optical axis of the projection optical system by adding a so-called "tilt" that moves a lens for moving the projected image up, down, left and right, the projection position of the image to be projected also changes. The relationship between the shift volume and the image projection position is known in advance, so it is possible to set the exposure calculation object scope based on the shift volume. With the present invention, even when the shift volume changes from the reference position of the optical axis of the projection optical system, it is possible to approximately maintain the average value of the gradation value of the adjustment pattern image for the imaged image at the desired gradation value.

The present invention does not absolutely require comprising of all of the various features described above, and it is possible to constitute the invention with part of these omitted or suitably combined. In addition to the constitution as the projector described above, the present invention may also be constituted as a projector control method invention. It is also possible to realize this in various aspects such as a computer program for realizing these, a recording medium for recording the program, data signals implemented within carrying waves including the program, and the like. Note that for each aspect, it is possible to use the various additional elements indicated above.

When constituting the present invention as the computer program or the recording medium on which that program is recorded or the like, it is also possible to constitute this as an overall program for controlling the projector operation, or to constitute it only as the part that achieves the functions of the present invention. Also, as the recording media, it is possible to use various computer readable media including a flexible disk, CD-ROM, DVD-ROM, optical magnetic disk, IC card, ROM cartridge, punch card, printed item on which is printed a code such as a bar code, computer internal memory device (memory such as RAM or ROM), and external memory devices.

BRIEF DESCRIPTION OF THE DRAWINGS

FIGS. 2(*a*) and (*b*) are explanatory drawings showing the exposure calculation object scope.

FIGS. 9 (A) and (B) are explanatory drawings for describing the effect by the automatic exposure adjustment function of a conventional monitor camera.

FIG. 10 (A) to (C) are explanatory drawings for describing the problems due to the automatic exposure adjustment function of the conventional monitor camera when the zoom volume is changed.

DESCRIPTION OF THE PREFERRED EMBODIMENTS

Following, aspects of implementing the present invention are described based on embodiments in the following order.
A. Projector Constitution (First Embodiment):
B. Image Projection Operation:
C. Exposure Target Value Setting Operation:
D. Effect of the Embodiment:
E. Second Embodiment:
F. Variation Examples:

A. Projector Constitution (First Embodiment)

Figure 1:
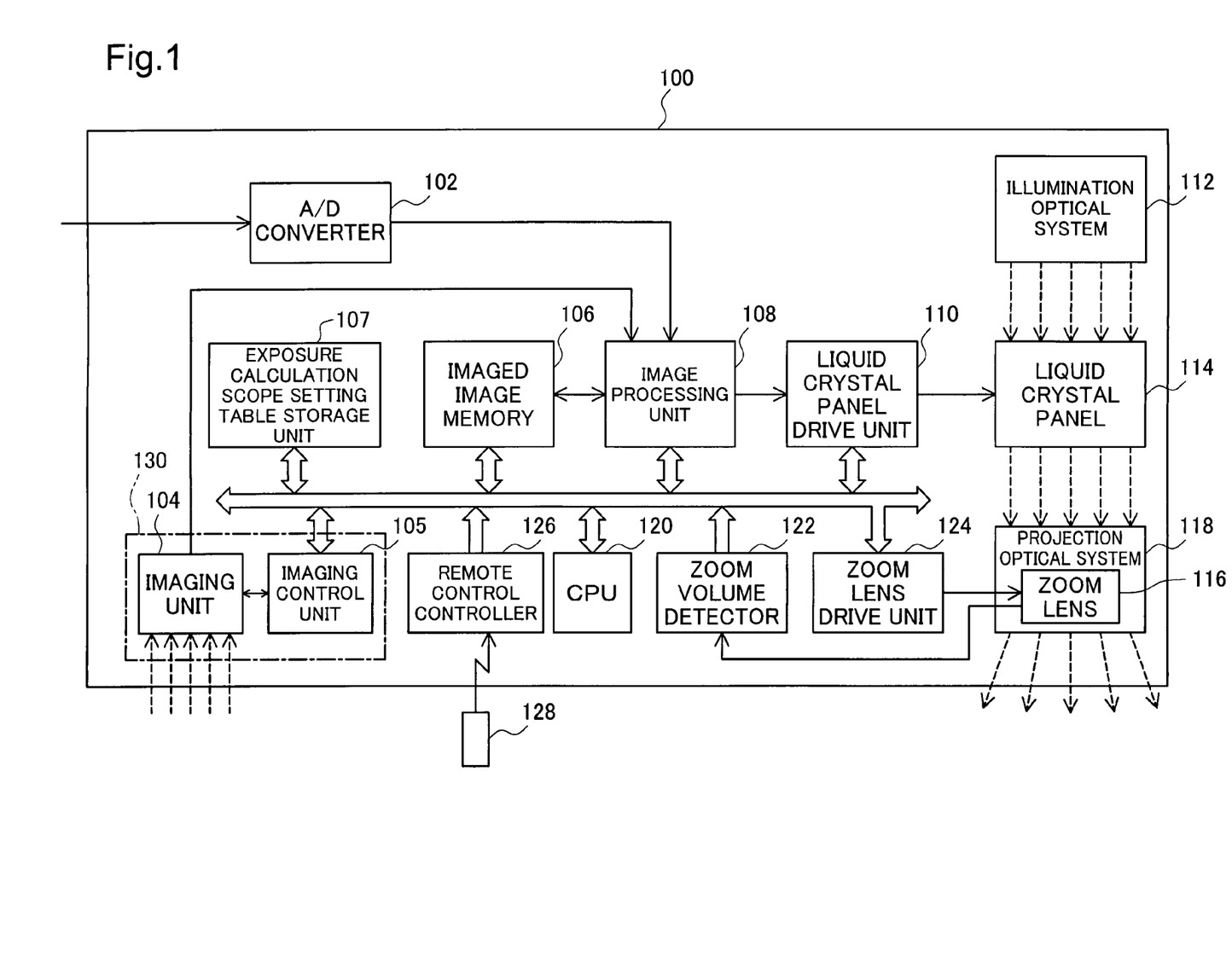
FIG. 1 is an explanatory drawing showing the schematic structure of a projector 100 as a first embodiment of the present invention.

FIG. 1 is an explanatory drawing showing the schematic structure of a projector 100 as a first embodiment of the present invention. This projector 100 is a liquid crystal projector for which it is possible to change the projection scope of the image projected on the screen. Also, this projector 100 comprises a monitor camera or the like having an automatic exposure adjustment function, and while performing automatic exposure adjustment by the monitor camera, the adjustment pattern image projected on the screen is imaged, that imaged image is analyzed, and based on those analysis results, it is possible to perform various adjustments such as zoom adjustment, keystone calibration, focus adjustment, and the like.

As shown in the drawing, the projector 100 comprises a projection optical system 118 comprising an A/D converter 102, an imaging unit 104, an imaging control unit 105, a imaged image memory 106, an exposure calculation object scope setting table storage unit 107, an image processing unit 108, a liquid crystal panel drive unit 110, an illumination optical system 112, a liquid crystal panel 114, and a zoom lens 116; a CPU 120; a zoom volume detector 122; a zoom lens drive unit 124; a remote control controller 126; and a remote control 128.

Note that with FIG. 1, the CPU 120 is depicted as only being connected to the imaging control unit 105, the imaged image memory 106, the image processing unit 108, the liquid crystal panel drive unit 110, the zoom volume detector 122, the zoom lens drive unit 124, and the remote control controller 126 via a bus, but actually it is also connected to other structural parts. Also, the imaging unit 104 comprises a CCD, and the imaging unit 104 and the imaging control unit 105 form a CCD module 130 as the monitor camera. This CCD module 130 is fixed to the projector 100. The zoom volume detector 122 may also be formed by a zoom encoder or the like, for example.

B. Image Projection Operation

Following is a brief description of the image projection operation that is the normal operation for the projector 100.

In FIG. 1, when the user used the remote control 128 to give instructions to start image projection, the remote control 128 conveys those input instructions to the remote control controller 126 using wireless communication. The remote control controller 126 conveys the instructions from the remote control 128 via the bus to the CPU 120. The CPU 120 controls each structural component including the image processing unit 108 based on those instructions and performs the image projection operation.

First, the A/D converter 120 inputs analog image signals output from a video player, television, DVD player or the like, or analog image signals output from a personal computer or the like, converts these analog image signals to digital image signals, and outputs them to the image processing unit 108. It is also possible to make this so that digital image signals are input without going via an A/D converter 102. The image processing unit 108 adjusts the input digital image signals so that the image display state, such as the luminance, contrast, synchronization, tracking, color density, color tone, and the like, for example, are in a desired state, and outputs them to the liquid crystal panel drive unit 110.

The liquid crystal panel drive unit 110 drives the liquid crystal panel 114 based on the input digital image signals. By doing this, with the liquid crystal panel 114, the illumination light radiated from the illumination optical system 112 is modulated according to the image information. The projection optical system 118 is attached to the front surface of the case of the projector 100, and the projection light modulated by the liquid crystal panel 114 is projected onto the screen (not illustrated). By doing this, the image is projected and displayed onto the screen. Note that with this embodiment, the projector 100 performs projection of an image on a screen, but it is also possible to perform projection of an image on another projection object such as a simple wall or the like.

C. Exposure Target Value Setting Operation

Following is described the setting of the exposure calculation object scope which is a characteristic part of the present invention for the projector 100.

The projector 100 of the present invention comprises a CCD module 130 or the like, and the adjustment pattern image projected on the screen is imaged by this CCD module 130, that imaged image is analyzed, and based on those analysis results, it is possible to perform various adjustments such as zoom adjustment, keystone calibration, focus adjustment, and the like. Then, the projector 100 performs automatic exposure adjustment when imaging the adjustment pattern image. When performing this automatic exposure adjustment, the exposure calculation value is calculated as necessary. At this time, the exposure calculation object scope on the imaged image which is the object of calculation of the exposure calculation value is set according to the zoom volume of the zoom lens 116.

First, after the user installs the projector 100 at a desired position in front of the screen, when the power supply of the projector 100 is turned on, the projector 100 projects and displays the adjustment pattern image on the screen to perform the various adjustments described above.

In specific terms, the image processing unit 108 generates the adjustment pattern image and outputs it to the liquid crystal panel drive unit 110 as digital image signals. As described previously, the liquid crystal panel drive unit 110 drives the liquid crystal panel 114 based on the input digital image signals, and the liquid crystal panel 114 modulates the illumination light radiated from the illumination optical system 112 according to that image information. The projection optical system 118 projects onto the screen via the zoom lens 116 or the like the projection light that was modulated by the liquid crystal panel 114. By doing this, the adjustment pattern image is displayed on the screen. With this embodiment, an image for which the entire surface is white was used as the adjustment pattern image.

In this way, after the adjustment pattern image is displayed on the screen, next, to adjust the size of the projection scope on the screen, the user operates the zoom button (not illustrated) on the remote control 128, and when instructions are given to change the zoom volume, the remote control 128 conveys those input instructions to the remote control controller 126 by wireless communication. The remote control controller 126 conveys the instructions from the remote control 128 to the CPU 120 via the bus. The CPU 120 controls the zoom lens drive unit 124 based on those instructions, drives the zoom lens 116 that the projection optical system 118 comprises, and changes the zoom volume of the zoom lens 116. After that, when the projection scope on the screen reaches the desired size, the user operates the zoom button of the remote control 128, and when instructions are given to stop the driving of the zoom lens 116, the CPU 120 controls the zoom lens drive unit 124 and stops the driving of the zoom lens 116. At this time, the zoom volume detector 122 detects the zoom volume of the zoom lens 116, and conveys those detection results to the CPU 120 as the zoom volume z. With this embodiment, the zoom volume z is z=0 when the zoom volume is set to the farthest telephoto side, and is z=255 when set to the farthest wide angle side. Also, with this embodiment, the zoom volume may be set to five increments between 0 and 255.

The CPU 120 reads the automatic exposure adjustment program from the memory (not illustrated), and executes automatic exposure adjustment processing. The flow of the automatic exposure adjustment process will be described later.

Figure 2A:
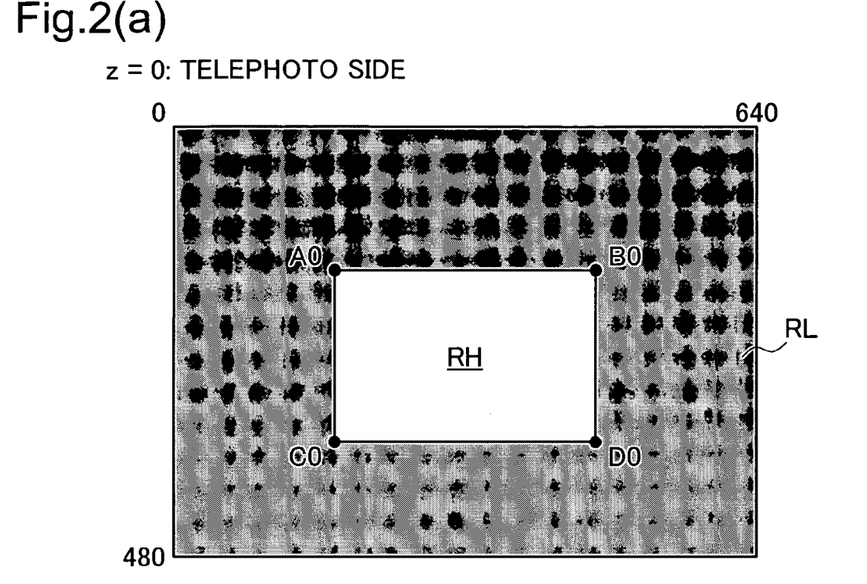
Figure 2B:
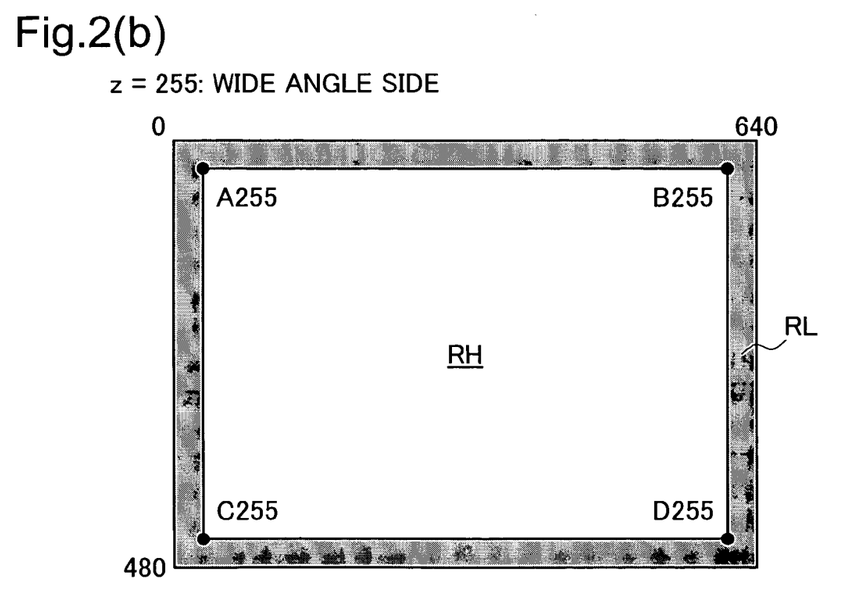

FIG. 2 is an explanatory drawing showing the exposure calculation object scope. In FIG. 2(a), the imaged image is shown when the zoom volume of the zoom lens 116 is set to the farthest telephoto side (zoom volume z=0). In FIG. 2(b), the imaged image is shown when the zoom volume of the zoom lens 116 is set to the farthest wide angle side (zoom volume z=255). As shown in the drawings, the imaged image comprises a white high gradation area RH in which the adjustment pattern image is displayed, and a low gradation area RL in which the adjustment pattern image is not displayed. The area of the high gradation area RH and the low gradation area RL changes according to the zoom volume z. With this embodiment, this high gradation area RH, specifically, the adjustment pattern image, is set as the exposure calculation object scope. With the example shown in the drawing, when the zoom volume z=0, the scope determined by the points A0, B0, C0, and D0 is set as the exposure calculation object scope (FIG. 2(a)). Also, when the zoom volume z=255, the scope determined by the points A255, B255, C255, and D255 is set as the exposure calculation object scope (FIG. 2(b)). Each of these coordinate values is noted in the exposure calculation object scope setting table stored in the exposure calculation object scope setting table storage unit 107 shown in FIG. 1.

Note that the numbers attached to each of the four points "A," "B," "C," and "D" indicate the zoom volume z value, and generally are represented by "Az," "Bz," "Cz," and "Dz."

Figure 3:
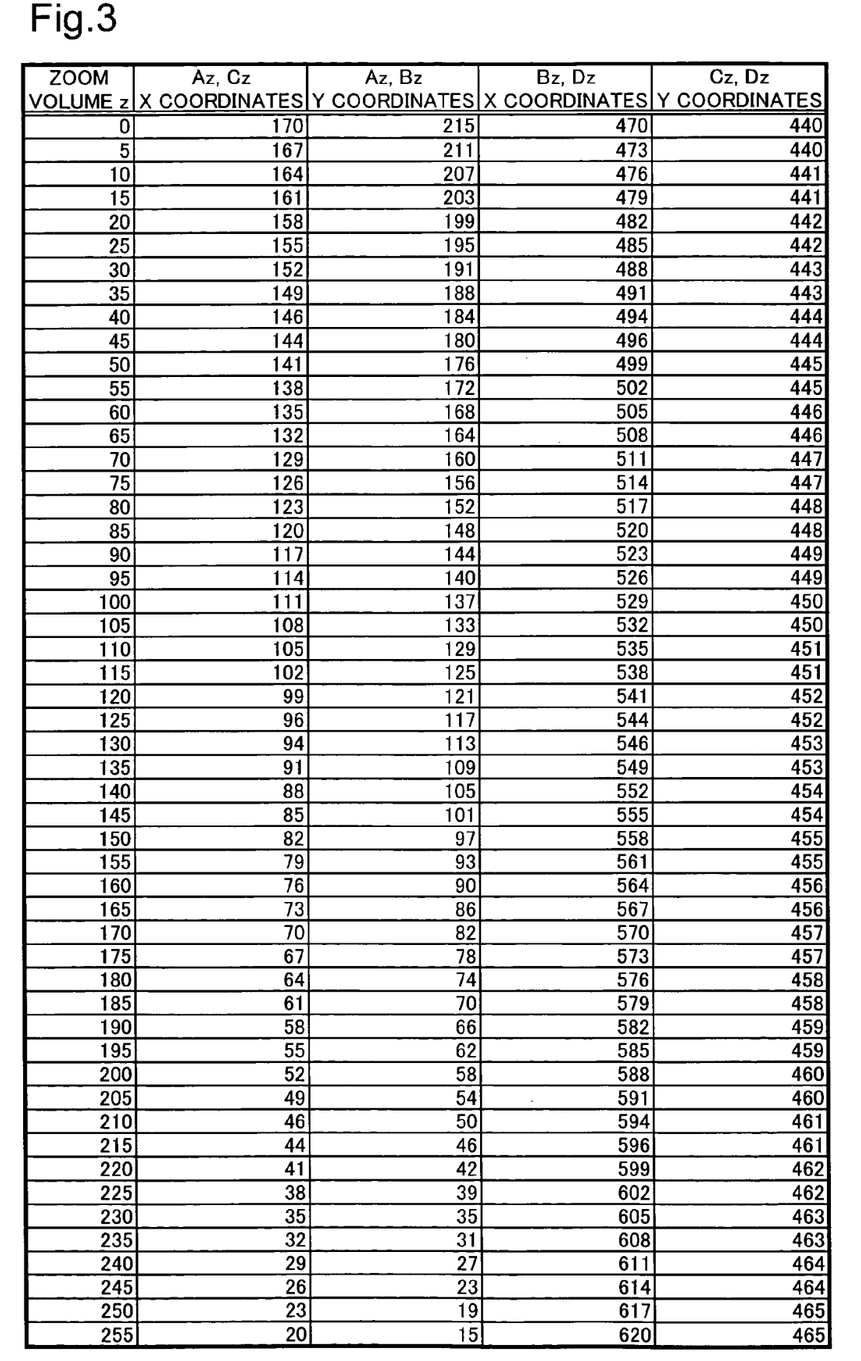
FIG. 3 is an explanatory drawing showing the contents of an exposure calculation object scope setting table for the first embodiment.

FIG. 3 is an explanatory drawing showing the contents of the exposure calculation object scope setting table for the first embodiment. An example when the pixel count of the CCD that the CCD module 130 comprises is 640×480 is shown. The exposure calculation object scope setting table is prepared for the all white surface adjustment pattern image. The zoom volume z and each coordinate value of the four vertices that determine the exposure calculation object scope are correlated and noted in this exposure calculation object scope setting table. For example, when the zoom volume z=0, the scope determined by the four vertices coordinate values Az= (170, 215), Bz=(470, 215), Cz=(170, 440), and Dz=(470, 440) is the exposure calculation object scope. It can be seen from this exposure calculation object scope setting table that together with expansion of the zoom volume z, the exposure calculation object scope also expands.

Figure 4:
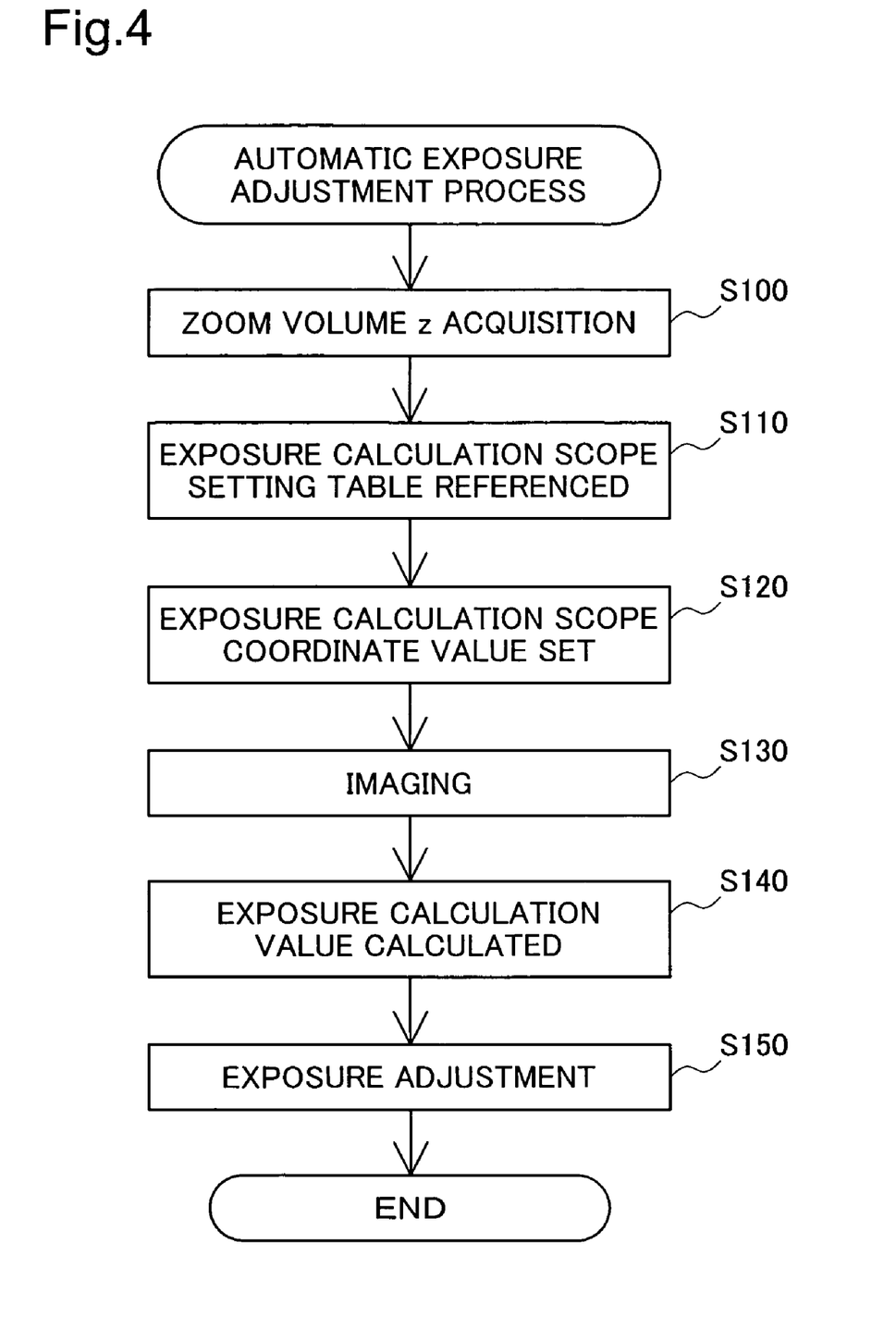
FIG. 4 is a flow chart showing the flow of the automatic exposure adjustment process for the first embodiment.

FIG. 4 is a flow chart showing the flow of the automatic exposure adjustment process for the first embodiment. This process is the process executed by the CPU 120 or the imaging control unit 105 when imaging the adjustment pattern image.

When this process starts, first, the CPU 120 acquires the zoom volume z detected by the zoom volume detector 122 (step S100). Then, the CPU 120 references the exposure calculation object scope setting table (step S110), and based on the zoom volume z acquired at step S100, sets the exposure calculation object scope (step S120). Then, the CPU 120 gives instructions to the imaging control unit 105 to do imaging, and the imaging control unit 105 performs imaging of the adjustment pattern image projected and displayed on the screen (step S130).

Next, the imaging control unit 105 calculates the exposure calculation value for the exposure calculation object scope set at step S120 from the imaged image (step S140). The exposure calculation value is the average value of the gradation values of each pixel within the exposure calculation object scope.

Then, the imaging control unit 105 controls at least one item among the shutter speed, gain, and aperture at the imaging unit 104 so that this exposure calculation value is approximately equal to the preset specified exposure target value, and performs exposure adjustment (step S150). The processes from steps S130 to S150 are repeated until the difference between the exposure calculation value and the exposure target value falls within a specified scope. Then, the automatic exposure adjustment process ends.

After the automatic exposure adjustment process described above ends, the imaged image is output as digital image signals to the image processing unit 108, and after the specified processing is implemented, this is written to the imaged image memory 106. The CPU 120 reads the digital image signals from the imaged image memory 106, acquires the imaged image, and analyzes that imaged image. Then, based on those analysis results, various adjustments are performed.

D. Effect of the Embodiment

Figure 5A:
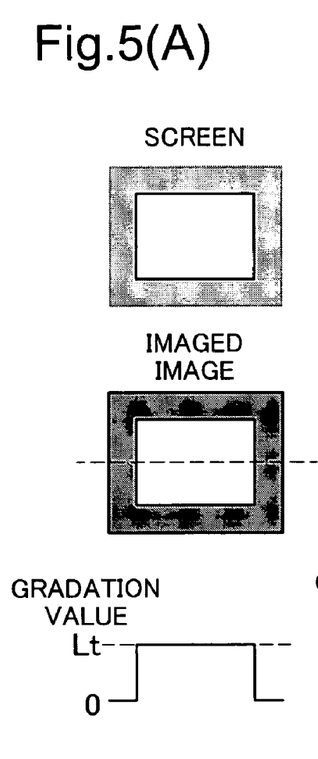
FIG. 5(A) to (C) are explanatory drawings showing the gradation values of each pixel of the white part for the imaged image when the zoom volume is changed.
Figure 5B:
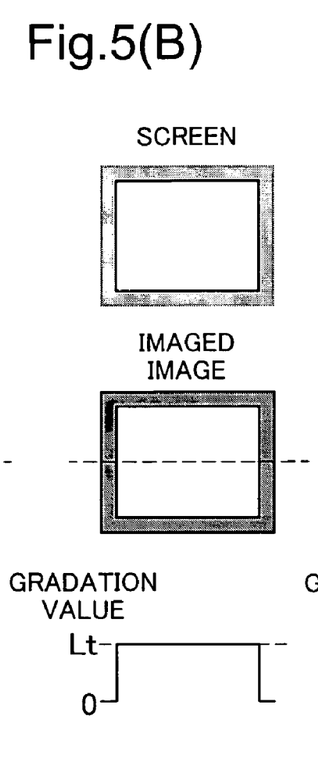
Figure 5C:
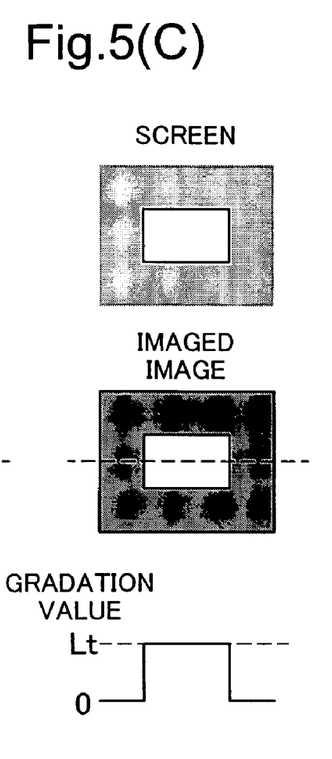

FIG. 5 is an explanatory drawing showing the gradation values of each pixel of the white part for the imaged image when the zoom volume is changed. In FIG. 5, the same as with FIG. 9 and FIG. 10, the upper level indicates the screen on which the adjustment pattern image is displayed, the middle level indicates the imaged image of that screen, and the lower level indicates the gradation values of the pixels for that imaged image. Also, FIG. 5(A) shows the status when the zoom volume of the zoom lens is set to the intermediate value, FIG. 5(B) shows a state when the zoom volume is set to the wide angle side, and FIG. 5(C) shows the state when the zoom volume is set to the telephoto side.

When the zoom volume is set to the specified intermediate value, as shown in the bottom level of FIG. 5(A), the gradation values of each pixel of the white part for the imaged image matches the desired gradation value Lt. With this embodiment, the exposure calculation object scope is set according to the zoom volume of the zoom lens 116, specifically, the zoom volume z, with the relative positional relationship between the adjustment pattern image scope for the imaged image and the exposure calculation object scope maintained at a fixed level. To say this another way, with this embodiment, the exposure calculation object scope is set so that the ratio of the area of the adjustment pattern image scope occupying the exposure calculation object scope for the imaged image is fixed, regardless of the zoom volume z. For example, when the zoom volume z is set to be larger than the zoom volume z of the case shown in FIG. 5(A), the projection scope of the adjustment pattern image expands, so the exposure calculation object scope setting is set wider by that expanded amount. Also, when the zoom volume z is set to be smaller than the zoom volume z of the case shown in FIG. 5(A), the projection scope of the adjustment pattern image is reduced, so the exposure calculation object scope setting is set narrower by that reduced amount. By arranging in this way, it is possible to maintain the exposure calculation value to be approximately fixed, regardless of the zoom volume z. Therefore, using automatic exposure adjustment, by changing the shutter speed, gain, aperture or the like so that the exposure calculation value is equal to the exposure target value, as shown in the lower level of FIGS. 5(B) and (C), it is possible to approximately maintain the gradation value of each pixel for the white part at the desired gradation value Lt.

With the projector 100 of this embodiment described above, even if the zoom volume of the zoom lens 116 is changed, it is possible to approximately maintain the average value of the gradation values of the adjustment pattern image for the imaged image at the desired gradation value Lt. As a result, it is possible to properly perform various adjustments such as zoom adjustment, keystone calibration, focus adjustment, and the like.

E. Second Embodiment

Figure 6:
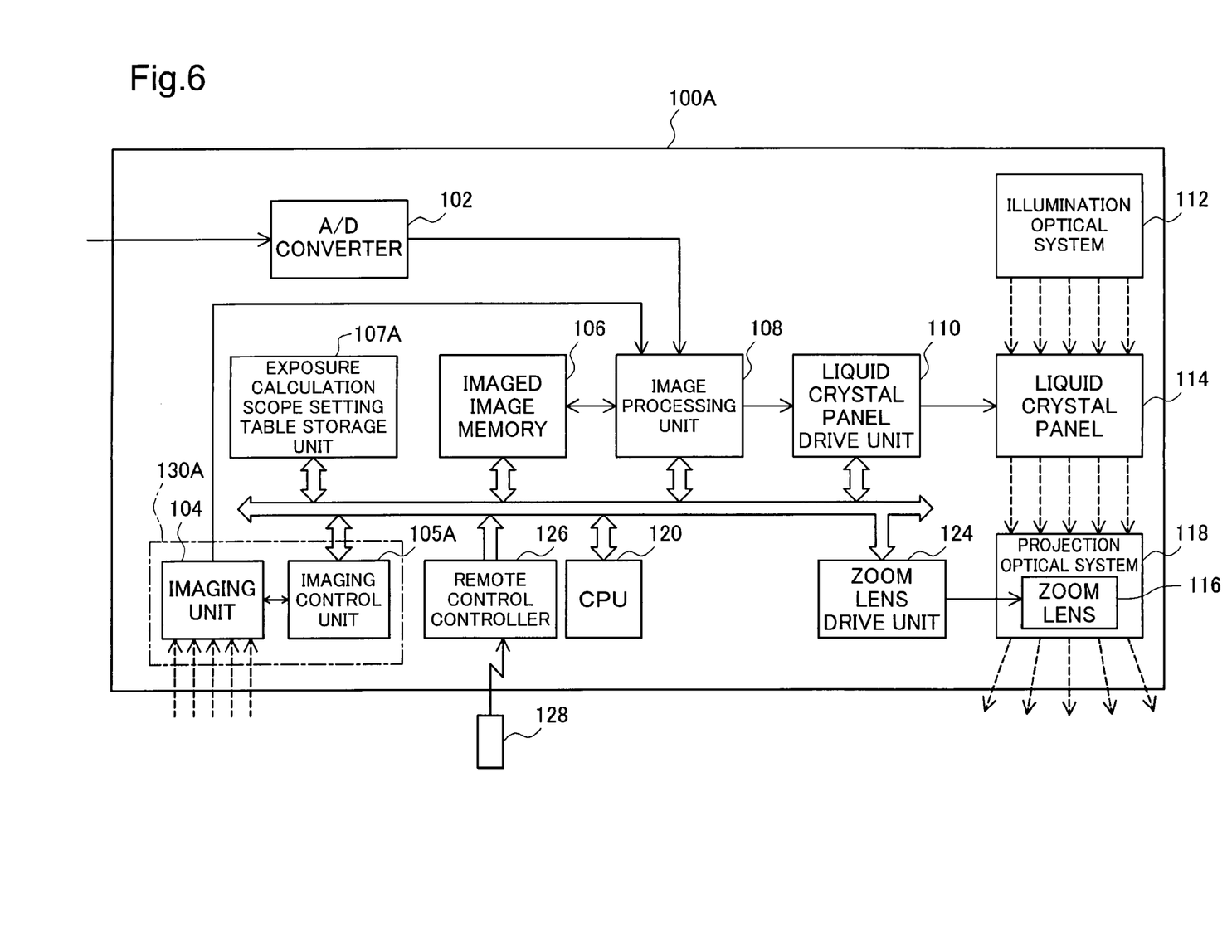
FIG. 6 is an explanatory drawing showing the schematic structure of the projector 100A as a second embodiment of the present invention.

FIG. 6 is an explanatory drawing showing the schematic structure of the projector 100A as a second embodiment of the present invention. The projector 100 of the first embodiment performed setting of the exposure calculation object scope based on the zoom volume z. In contrast to this, the projector 100A of the second embodiment sets the exposure calculation object scope based on, instead of the zoom volume z, the area SH of the high gradation area RH of the imaged image (see FIG. 2), specifically, the pixel count of the high gradation area RH. Therefore, the projector 100A differs from the projector 100 of the first embodiment in that it does not comprise a zoom volume detector 122. Also, the contents of the exposure calculation object scope setting table stored in the exposure calculation object scope setting table storage unit 107A differ from those of the projector 100 of the first embodiment. Other than this, this is approximately the same as the projector 100 of the first embodiment. Therefore, only the items that differ from the first embodiment are described.

Note that for the second embodiment, the reason that it is possible to use the area SH of the high gradation area RH for the imaged image instead of the zoom volume z is that as described hereafter, it is possible to represent the area SH of the high gradation area RH as a function of the zoom volume z.

Now, for the imaged image, the length of the horizontal side of the high gradation area RH is w, the length of the vertical side is h, and the area of the high gradation area RH is SH. At this time, the length of the horizontal side of the high gradation area RH w may be represented by the equation (1) shown hereafter.

$$w = k \times z + w0 \quad (1)$$

Note that k and w) are both constants.

It is also possible to represent the length of the vertical side of the high gradation area RH using the following equation (2).

$$h = K \times w \quad (2)$$

Note that K is a coefficient according to the aspect ratio of the high gradation area RH. For example, when the aspect ratio of the high gradation area RH is 4:3, then K=¾.

Therefore, the area SH of the adjustment pattern image may be represented by the following equation (3).

$$\begin{aligned} SH &= w \times h \\ &= w \times K \times w \\ K &\times (k \times z + w0)^2. \end{aligned} \quad (3)$$

Figure 7:
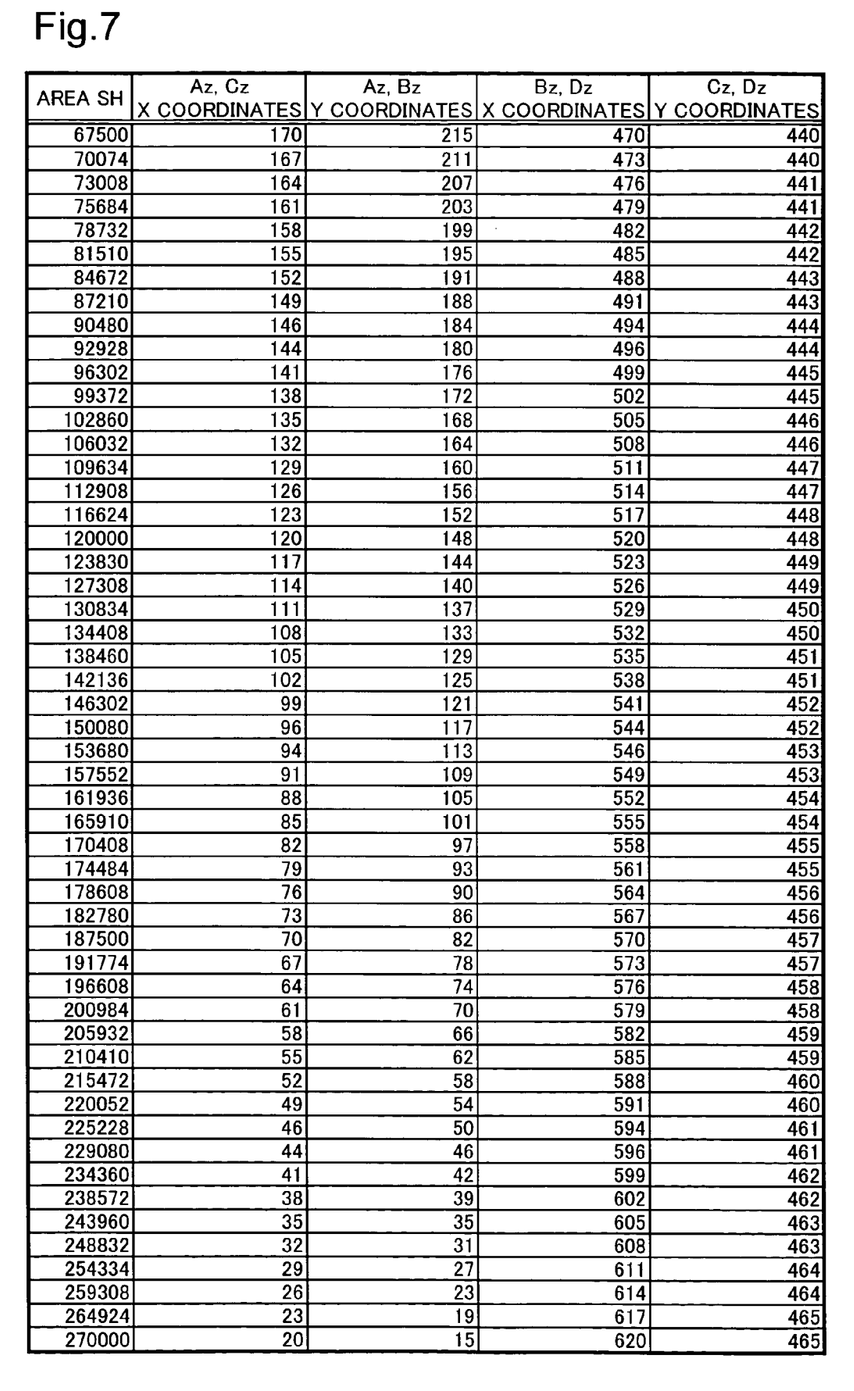
FIG. 7 is an explanatory drawing showing the contents of an exposure calculation object scope setting table for the second embodiment.

FIG. 7 is an explanatory drawing showing the contents of the exposure calculation object scope setting table for the second embodiment. This shows an example of a case when the pixel count of the CCD that the CCD module 130 comprises is 640×480. With this embodiment, the exposure calculation object scope setting table is prepared for the all white surface adjustment pattern image. The area SH of the high gradation area RH and each coordinate value of the four vertices that determine the exposure calculation object scope are correlated and noted in this exposure calculation object scope setting table. For example, when the high gradation area RH area SH=67500, the scope determined by the four vertices coordinate values Az=(170, 215), Bz=(470, 215), Cz=(170, 440), and Dz=(470, 440) is the exposure calculation object scope.

Note that in the exposure calculation object scope setting table shown in the drawing, each area SH corresponds to the logical value of the area of the high gradation area RH for each zoom value z. For example, the topmost level area SH=67500 corresponds to the area of the high gradation area RH when the zoom volume of the zoom lens is set to the farthest telephoto side (zoom value z=0 for the first embodiment). Also, the bottom most level area SH=270000 corresponds to the area of the high gradation area RH when the zoom volume of the zoom lens is set to the farthest wide angle side (zoom value z=255 for the first embodiment). From this exposure calculation object scope setting table, it can be seen that the area SH of the high gradation area RH is expanded and also that the exposure calculation object scope becomes wider.

Figure 8:
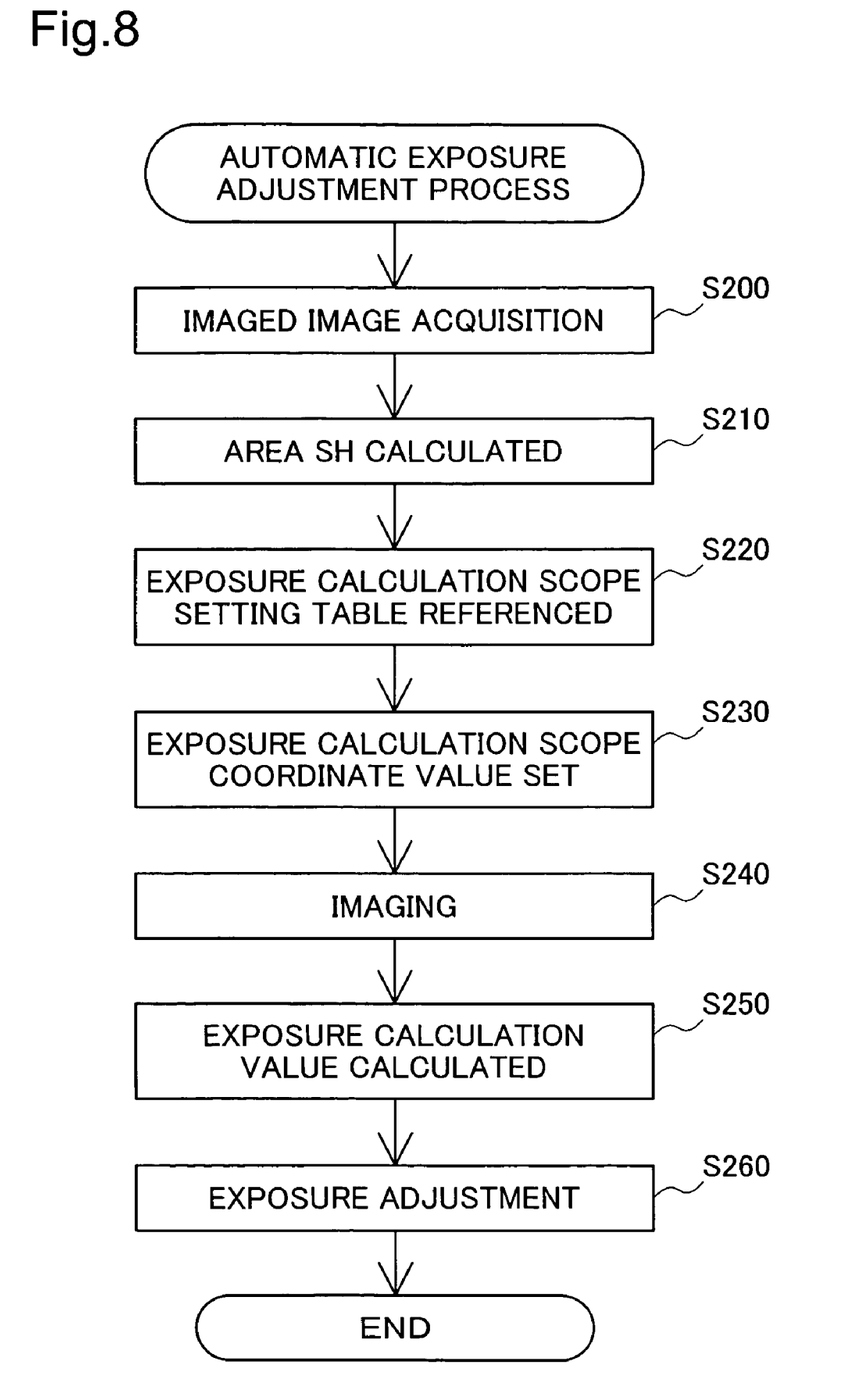
FIG. 8 is a flow chart showing the flow of the automatic exposure adjustment process for the second embodiment.

FIG. 8 is a flow chart showing the flow of the automatic exposure adjustment process for the second embodiment.

When this process starts, first, the CPU 120 gives instruction to do imaging to the imaging control unit 105, imaging of the adjustment pattern image projected and displayed on the screen is performed, and the imaged image is acquired (step S200). Next, the CPU 120 analyzes the imaged image, and calculates the area SH of the high gradation area RH, specifically, the pixel count of the high gradation area RH (step S210). Then, the CPU 120 references the exposure calculation object scope setting table (step S220), and based on the area SH calculated at step S210, sets the exposure calculation object scope (step S230). At this time, the area SH calculated at step S210 includes errors, so there are many cases when this does not match the area SH in the exposure calculation object scope setting table. In this case, the area SH for the exposure calculation object scope setting table that is closest to the calculated area SH is referenced, and the exposure calculation object scope is set. Then, the CPU 120 again gives instructions to the imaging control unit 105 to do imaging, and the imaging control unit 105 performs imaging of the adjustment pattern image projected and displayed on the screen (step S240).

Next, the imaging control unit 105 calculates the exposure calculation value for the exposure calculation object scope set at step S230 from the imaged image (step S250). Then, the imaging control unit 105 controls at least one item among the shutter speed, gain, and aperture for the imaging unit 104 so that this exposure calculation value is approximately equal to the preset specified exposure target value, and performs exposure adjustment (step S260). The processes of steps S240 to S260 are repeated until the difference between the exposure calculation value and the exposure target value falls within a specified scope. Then, the automatic exposure adjustment process ends.

After the automatic exposure adjustment process described above ends, as with the first embodiment, the imaged image is output as digital image signals to the image processing unit 108, and after the specified processing is implemented, this is written to the imaged image memory 106. The CPU 120 reads the digital image signals from the imaged image memory 106, acquires the imaged image, and analyzes that imaged image. Then, based on those analysis results, various adjustments are performed.

With the projector 100A of the second embodiment described above, it is possible to calculate the exposure calculation value with the relative positional relationship between the adjustment pattern image scope for the imaged image and the exposure calculation object scope maintained at a fixed level even when the zoom volume of the zoom lens is changed. This exposure calculation value is approximately constant, regardless of the zoom volume of the zoom lens. Therefore, by performing exposure adjustment so that this exposure calculation value is approximately equal to the specified exposure target value, it is possible to approximately maintain the average value of the gradation values of the adjustment pattern image for the imaged image at the desired gradation value even when the zoom volume of the zoom lens changes. As a result, it is possible to properly perform various adjustments such as zoom adjustment, keystone calibration, focus adjustment, and the like.

F. Variation Examples

Above, several aspects of implementing the present invention were described, but the present invention is not limited to this kind of embodiment, and may be implemented in various aspects within a scope that does not stray from its main spirit. For example, variation examples such as the following are possible.

F1. Variation Example 1

With the first embodiment described above, the exposure calculation object scope setting table was referenced, and setting of the exposure calculation object scope was performed based on the zoom volume z, but the invention is not limited to this. The relationship between the zoom volume z and the magnification of the projection image is known in advance, so it is also possible to set the exposure calculation object scope using a specified arithmetic operation based on the zoom volume z.

In FIG. 2, with an example of a case when the exposure calculation object scope when the zoom volume z=0 is determined by the four vertices below, the calculation method of the exposure calculation object scope is described.

$A0=(x1, y1)$;
$B0=(x2, y1)$;
$C0=(x1, y2)$;
$D0=(x2, y2)$;

In this case, when the zoom volume z expands, each coordinate value of the four vertices change as shown hereafter.

$$Az=(x1-dx, y1-dy1);$$

$$Bz=(x2+dx, y1-dy1);$$

$$Cz=(x1-dx, y2+dy2);$$

$$Dz=(x2+dx, y2+dy2);$$

Here, dx is the change volume of each point in the x direction. $dx=p \times z$; dy1 is the change volume in the y direction of the points A0 and B0 that form the upper side of the exposure calculation object scope.

$$dy1=q \times z;$$

dy2 is the change volume in the y direction of the points C0 and D0 that form the bottom side of the exposure calculation object scope.

$$dy2=r \times z;$$

Note that p, q, and r are coefficients determined by the shift volume of the optical axis of the projection optical system 118. With this variation example, the shift volume is fixed.

Because there is the relationship described above between the zoom volume z of the zoom lens and the coordinate values of each vertex that determines the exposure calculation object scope, it is possible to set the exposure calculation object scope using an arithmetic operation. Note that with the first embodiment noted above, it is not necessary to perform the arithmetic operation described above, so there is the advantage that it is possible to set the exposure calculation object scope at a higher speed than this variation example. On the other hand, with this variation example, there is the advantage that it is not necessary to maintain the exposure calculation object scope setting table for the first embodiment.

F2. Variation Example 2

With the embodiments described above, the exposure calculation object scope is set based on the zoom volume z of the zoom lens or the area SH of the high gradation area RH for the imaged image, but the invention is not limited to this. For the projector for which it is possible to change the shift volume of the optical axis of the projection optical system, it is also possible to further set the exposure calculation object scope based on the shift volume. The shift volume of the optical axis of the projection optical system may be detected by providing a shift volume detector. In this case, it is possible to set the exposure calculation object scope by calculating the coefficients p, q, and r for the first embodiment noted above as a function of the shift volume, for example. By arranging in this way, even when the shift volume of the optical axis of the projection optical system changes, it is possible to approximately maintain the average value of the gradation values of the adjustment pattern image for the imaged image at the desired gradation value.

F3. Variation Example 3

With the embodiments described above, the all white image was used as the adjustment pattern image, but the invention is not limited to this. It is also possible to use as the adjustment pattern image an image having a specified gradation pattern, a logo or the like, for example.

F4. Variation Example 4

With the embodiments described above, the exposure calculation object scope was the adjustment pattern image scope for the imaged image, but the invention is not limited to this. The exposure calculation object scope is acceptable as long as at least part of the adjustment pattern image for the imaged image is included, and the relative positional relationship of the adjustment pattern image scope and the exposure calculation object scope is fixed, regardless of the zoom volume of the zoom lens. In this case, for example, it is also possible to have the exposure calculation object scope be a specified scope including the adjustment pattern image for the imaged image, or to have it be a specified scope within the adjustment pattern image.

Also, with the embodiments described above, the exposure calculation object scope was a rectangular scope, but it may also be another shaped scope such as a circle, an oval, a polygon, or the like.

F5. Variation Example 5

With the second embodiment described above, the exposure calculation object scope was set based on the area SH of the high gradation area RH, but the invention is not limited to this. Generally, it is acceptable to set the exposure calculation object scope based on specified parameters relating to the area of the high gradation area RH, and, for example, the exposure calculation object scope may also be set based on the length of one side of the high gradation area RH (e.g. the length between Az and Bz in FIG. 2).

F6. Variation Example 6

With the embodiments described above, the projectors 100 and 100A were liquid crystal projectors, but these may also be DLP projectors (DLP is a registered trademark).

What is claimed is:

1. A projector that projects images on a projection object, the projector comprising:
   a zoom lens for which it is possible to change the projection scope of the images projected onto the projection object;
   an imaging unit for imaging the projected specified images; and an imaging control unit for performing exposure adjustment in the imaging unit, and wherein the imaging control unit sets an exposure calculation object scope for the imaged image for which an exposure calculation value is to be calculated based on the zoom lens zoom volume, calculates the exposure calculation value from the imaged image for the set exposure calculation object scope, and performs the exposure adjustment so that the calculated exposure calculation value is approximately equal to a specified exposure target value.

2. The projector in accordance with claim 1, wherein the imaging control unit may also be made so that when the zoom volume is a second zoom volume that is larger than a first zoom volume for the exposure calculation object scope when the zoom volume is the first zoom volume, the exposure calculation object scope is set to be bigger.

3. The projector in accordance with claim 1, further comprising:

a specified exposure calculation object scope setting table that is prepared for the specified image and notes the relationship between the zoom volume and the exposure calculation object scope, and wherein the imaging control unit references the exposure calculation object scope setting table and sets the exposure calculation object scope based on the zoom volume.

4. The projector in accordance with claim 1, further comprising:

a shift volume change unit for changing a shift volume from a reference position of an optical axis of the projection optical system, and wherein the imaging control unit further sets the exposure calculation object scope based on the shift volume.

5. A projector that projects images on a projection object, the projector comprising:

a zoom lens for which it is possible to change a projection scope of a specified image projected on the projection object;

an imaging unit for imaging the projected specified image; and an imaging control unit for performing exposure adjustment in the imaging unit, and wherein the imaged image has a high gradation area with a relatively high gradation value and a low gradation area with a relatively low gradation value, and the imaging control unit derives specified parameters relating to the area of the high gradation area from the imaged image, sets an exposure calculation object scope for the imaged image for which an exposure calculation value is to be calculated based on the derived parameters, calculates the exposure calculation value for the set exposure calculation object scope from the imaged image, and performs the exposure adjustment so that the calculated exposure calculation value is approximately equal to a specified exposure target value.

6. The projector in accordance with claim 5, further comprising:

an exposure calculation object scope setting table that is prepared for the specified image and notes the relationship between the parameters and the exposure calculation object scope, and wherein the imaging control unit references the exposure calculation object scope setting table and sets the exposure calculation object scope based on the parameters.

7. The projector in accordance with claim 5, further comprising:

a shift volume change unit for changing a shift volume from a reference position of an optical axis of the projection optical system, and wherein the imaging control unit further sets the exposure calculation object scope based on the shift volume.

8. A control method for a projector that projects images on a projection object, the projector comprising: a zoom lens for which it is possible to change the projection scope of the image projected on the projection object; and an imaging unit for imaging the projected image, the control method comprising the steps of:

(a) setting an exposure calculation object scope for the imaged image for which an exposure calculation value is to be calculated based on a zoom lens zoom volume; and (b) calculating the exposure calculation value for the set exposure calculation object scope from the imaged image, and performing exposure adjustment in the imaging unit so that the calculated exposure calculation value is approximately equal to a specified exposure target value.

9. A control method for a projector that projects images on a projection object, the projector comprising: a zoom lens for which it is possible to change the projection scope of an image projected on the projection object; and an imaging unit for imaging the projected image, the imaged image comprising a high gradation area with a relatively high gradation value and a low gradation area with a relatively low gradation value, the control method comprising the steps of:

(a) deriving specified parameters relating to the area of the high gradation area from the imaged image;

(b) setting an exposure calculation object scope for the imaged image for which an exposure calculation value is to be calculated based on the derived parameters; and (c) calculating the exposure calculation value for the set exposure calculation object scope from the imaged image, and performing exposure adjustment in the imaging unit so that the calculated exposure calculation value is approximately equal to a specified exposure target value.

* * * * *